US008565202B2

(12) United States Patent
Nagasaki

(10) Patent No.: US 8,565,202 B2
(45) Date of Patent: Oct. 22, 2013

(54) WIRELESS COMMUNICATION DEVICE

(75) Inventor: Takeshi Nagasaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 115 days.

(21) Appl. No.: 13/053,516

(22) Filed: Mar. 22, 2011

(65) Prior Publication Data

US 2011/0237241 A1   Sep. 29, 2011

(30) Foreign Application Priority Data

Mar. 26, 2010   (JP) ................................. 2010-073431

(51) Int. Cl.
*H04W 4/00*   (2009.01)

(52) U.S. Cl.
USPC ........... 370/338; 370/252; 370/254; 370/328; 370/329; 370/330; 455/418; 455/419; 455/420; 455/41.2; 455/552.1; 455/553.1; 709/221; 709/222; 709/223; 709/224; 709/225; 709/226; 709/227; 709/228; 709/229

(58) Field of Classification Search
USPC ........... 455/418, 419, 420, 41.2, 41.3, 414.1, 455/553.1, 552.1; 370/252, 254, 328, 329, 370/330, 338; 709/221, 222, 223, 224, 225, 709/226, 227, 228, 229
See application file for complete search history.

(56) References Cited

U.S. PATENT DOCUMENTS

| | | | | |
|---|---|---|---|---|
| 6,633,759 B1 * | 10/2003 | Kobayashi | ..................... | 455/419 |
| 7,212,513 B2 * | 5/2007 | Gassho et al. | ................. | 370/338 |
| 7,221,667 B2 * | 5/2007 | Hori et al. | ...................... | 370/338 |
| 7,570,972 B2 * | 8/2009 | Pirzada et al. | ............. | 455/556.2 |
| 7,586,889 B2 * | 9/2009 | Gassho et al. | ................. | 370/338 |
| 2003/0092395 A1 * | 5/2003 | Gassho et al. | ................... | 455/68 |
| 2005/0096027 A1 * | 5/2005 | Takahashi et al. | ............ | 455/418 |
| 2006/0259667 A1 | 11/2006 | Kawai | | |
| 2006/0268805 A1 * | 11/2006 | Kawai et al. | ................... | 370/338 |
| 2009/0046686 A1 * | 2/2009 | Izaki | ............................. | 370/338 |
| 2010/0330924 A1 | 12/2010 | Sakai | | |

FOREIGN PATENT DOCUMENTS

| | | |
|---|---|---|
| CN | 1863124 A | 11/2006 |
| EP | 1722514 A1 | 11/2006 |
| JP | 06-069870 A | 3/1994 |
| JP | 2008-147789 | 6/2008 |
| JP | 2008-182439 A | 8/2008 |
| JP | 2009-224821 | 10/2009 |

OTHER PUBLICATIONS

Office Action issued in corresponding European Patent Application No. 11158704.4-1244 dated May 18, 2012.

(Continued)

*Primary Examiner* — Olumide T Ajibade Akonai
(74) *Attorney, Agent, or Firm* — Banner & Witcoff, Ltd.

(57) ABSTRACT

A first wireless communication device may communicate specific data with a second wireless communication device by utilizing a wireless connection according to wireless communication setting information for communicating the specific data. The first wireless communication device may send second wireless setting information to the second wireless communication device by utilizing a first wireless connection according to first wireless setting information in a case where an instruction is input. The first wireless communication device may (A) newly set the second wireless setting information as the wireless setting information for communicating the specific data in a case where a predetermined signal is received, and (B) maintain the first wireless setting information as the wireless setting information for communicating the specific data in a case where the predetermined signal is not received.

14 Claims, 7 Drawing Sheets

(56) References Cited

OTHER PUBLICATIONS

Extended European search report for application No. 11158704.4 mailed Jun. 7, 2011.

Notification of Reasons for Rejection issued in corresponding Japanese Patent Application No. 2010-073431 dated Jul. 17, 2012.

Chinese Office Action for Chinese Patent Application No. 201110080007.5 issued Apr. 16, 2013.

\* cited by examiner

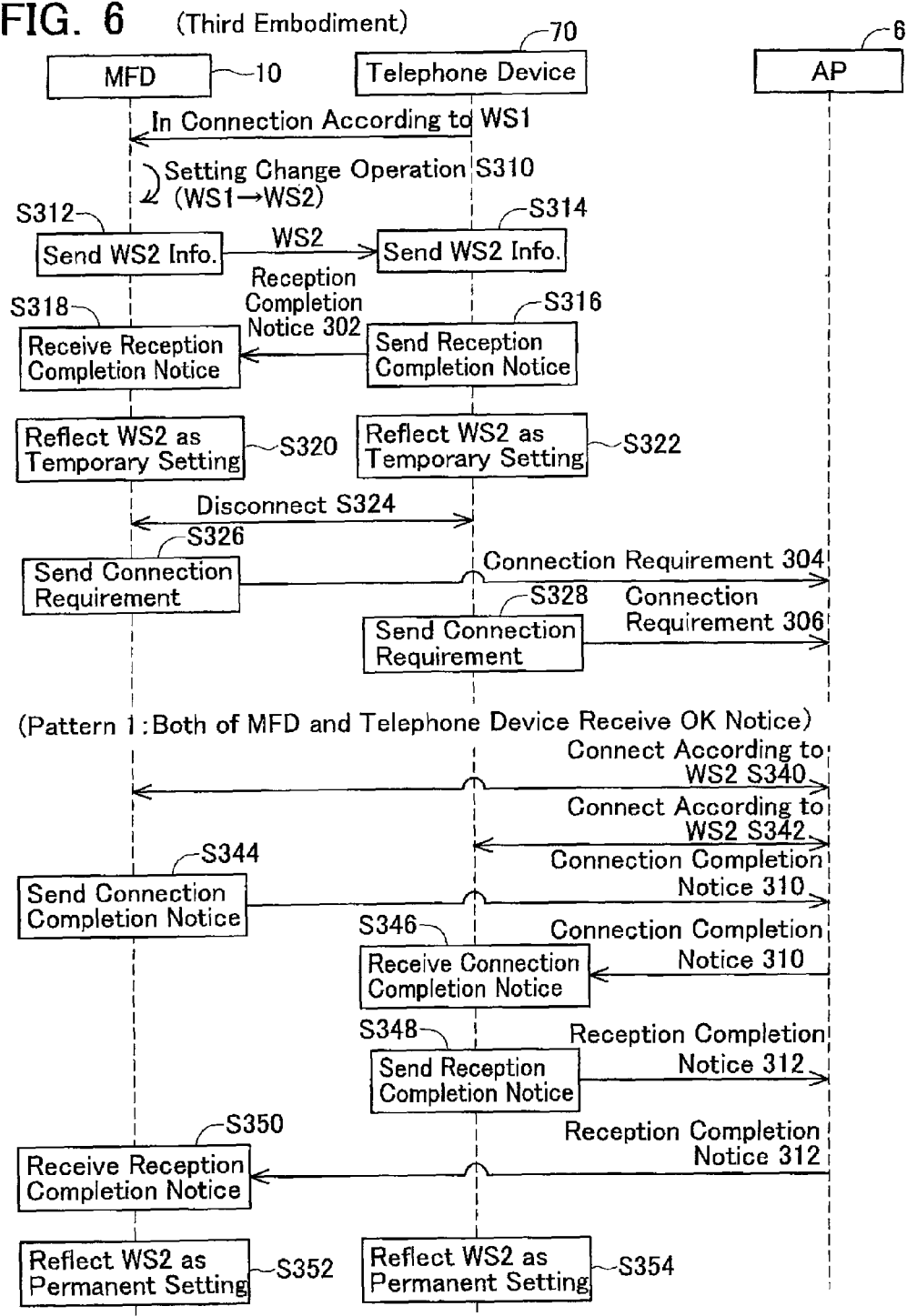

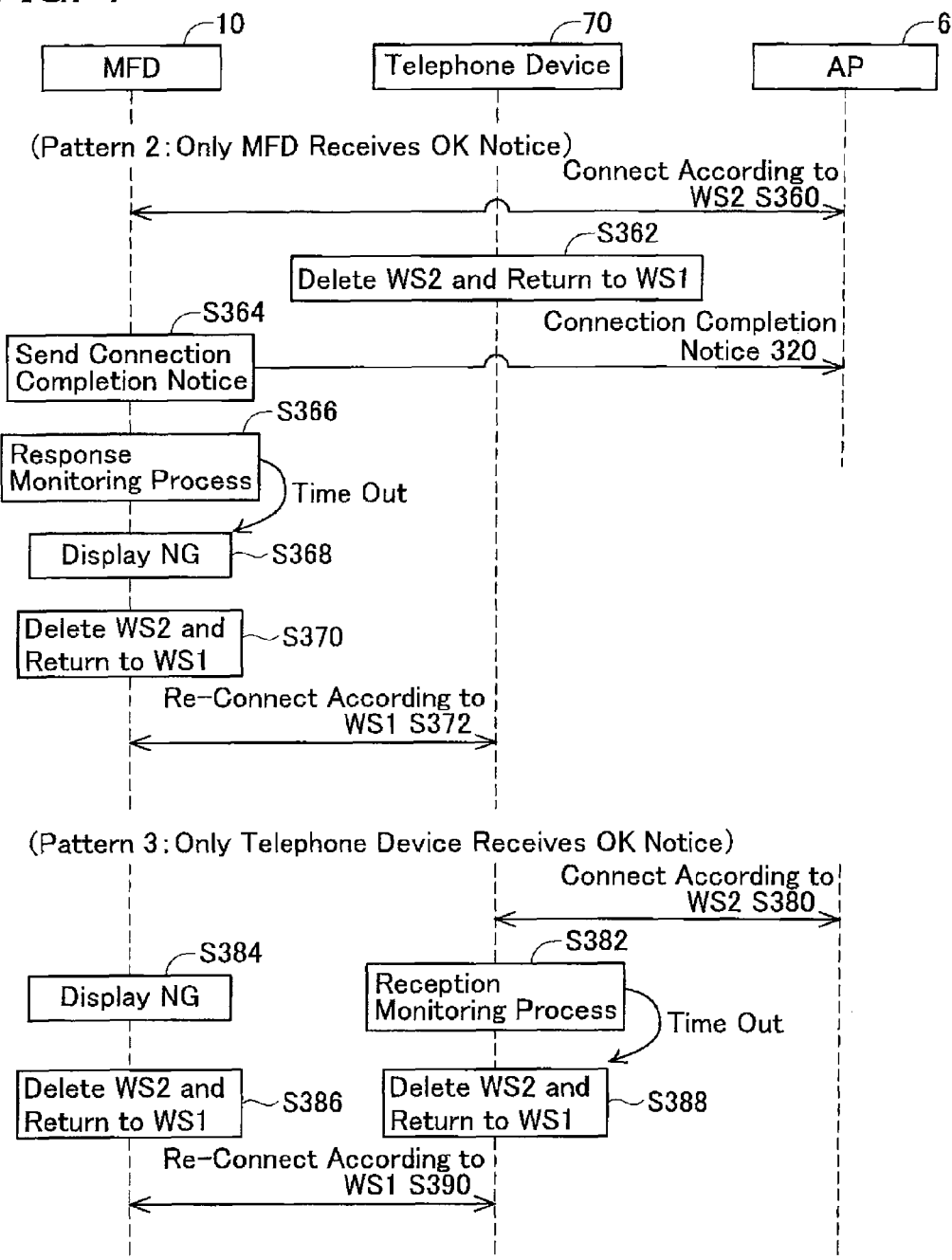

WIRELESS COMMUNICATION DEVICE

CROSS-REFERENCE TO RELATED APPLICATIONS

This application claims priority to Japanese Patent Application No. 2010-073431, filed on Mar. 26, 2010, the contents of which are hereby incorporated by reference into the present application.

TECHNICAL FIELD

The present specification teaches a wireless communication device that communicates wirelessly with another wireless communication device.

DESCRIPTION OF RELATED ART

A wireless telephone that communicates wirelessly between a base unit and a handset is known. The base unit and the handset communicate wirelessly directly and not via an access point. That is, an ad-hoc wireless communication technique is known. Moreover, a technique where a pair of wireless communication devices wirelessly communicates indirectly via an access point; i.e., an infrastructure wireless communication technique, is also known.

SUMMARY

In both the ad-hoc wireless communication technique and the infrastructure wireless communication technique, the same wireless setting information (e.g., authentication method, encryption method, etc.) must be set in each of the pair of wireless communication devices for the pair of wireless communication devices to properly communicate wirelessly. That is, in a state where differing wireless setting information has been set in the pair of wireless communication devices, the pair of wireless communication devices cannot properly communicate wirelessly. In the present specification, a technique is disclosed for inhibiting an occurrence of a phenomenon where a pair of wireless communication devices cannot properly communicate wirelessly.

One technique disclosed in the present application is a first wireless communication device configured to be wirelessly connected with a second wireless communication device. The first wireless communication device may comprise a communication unit, a first sending unit, and a setting unit. The communication unit may be configured to communicate specific data with the second wireless communication device by utilizing a wireless connection according to wireless communication setting information for communicating the specific data. The first sending unit may be configured to send second wireless setting information to the second wireless communication device by utilizing a first wireless connection according to first wireless setting information in a case where an instruction is input, the instruction being for changing the first wireless setting information currently being set in the first wireless communication device as the wireless setting information for communicating the specific data to the second wireless setting information. The setting unit may be configured to newly set the second wireless setting information as the wireless setting information for communicating the specific data in a case where a predetermined signal is received, the predetermined signal sent from the second wireless communication device to the first wireless communication device when the second wireless communication device changes the first wireless setting information currently being set in the second wireless communication device to the second wireless setting information. The setting unit may be configured to maintain the first wireless setting information as the wireless setting information for communicating the specific data in a case where the predetermined signal is not received.

Moreover, the first wireless communication device is novel and has utility as a single unit. The second wireless communication device is also novel and has utility as a single unit. Further, a control method, computer program, and non-transitory computer readable storage medium storing the computer program for realizing the first wireless communication device are also novel and have utility. A control method, computer program, and non-transitory computer readable storage medium storing the computer program for realizing the second wireless communication device are novel and have utility. Further, a wireless communication system provided with the first wireless communication device and the second wireless communication device is novel and has utility.

BRIEF DESCRIPTION OF THE DRAWINGS

FIG. 6 shows a sequence view of processes performed by devices of a third embodiment; and FIG. 7 shows a sequence view of processes performed by devices of the third embodiment.

EMBODIMENT

First Embodiment (Configuration of System)

Figure 1:
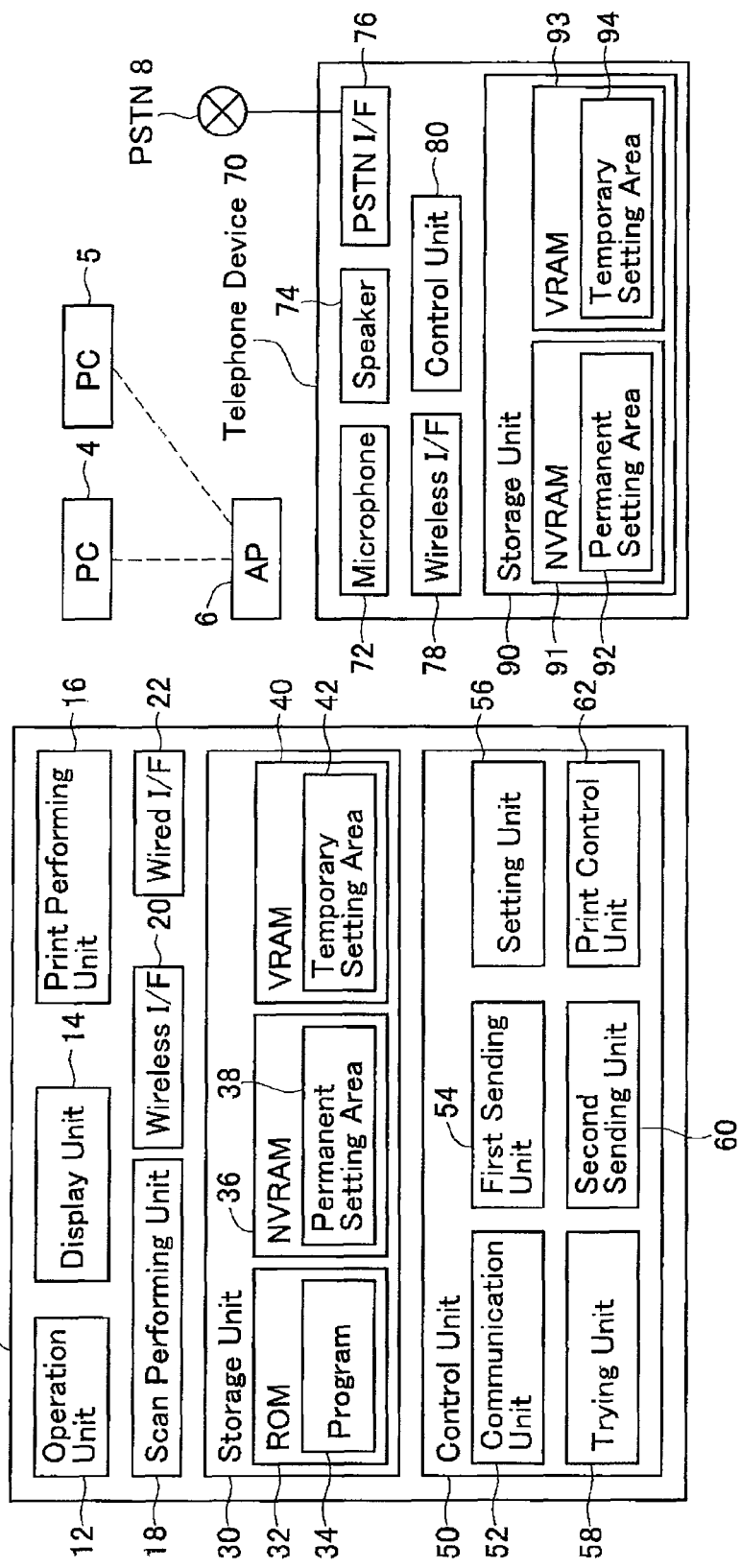
FIG. 1 shows a configuration of a wireless communication system of embodiments.

The first embodiment will be described with reference to the figures. As shown in FIG. 1, a wireless communication system 2 comprises a plurality of PCs 4, 5, an AP (access point) 6, a multi-function device 10, and a telephone device 70. The PC 4 and the PC 5 can wirelessly communicate with one another via the AP 6. The multi-function device 10 and the telephone device 70 can wirelessly communicate with one another either via the AP 6 or not via the AP 6. That is, the multi-function device 10 and the telephone device 70 can perform an infrastructure wireless communication or ad-hoc wireless communication. Moreover, in the present embodiment, the wireless communication is performed based on the standards 802.11 of the IEEE (The Institute of Electrical and Electronics Engineers, Inc.), and standards conforming thereto (802.11a, 11b, etc.). Consequently, wireless setting information WS1, WS2 (to be described) is wireless setting information conforming to those standards.

(Configuration of Multi-Function Device 10)

The configuration of the multi-function device 10 will be described in detail. The multi-function device 10 is capable of performing multiple functions, such as print function, scanner function, copy function, etc. The multi-function device 10 comprises an operation unit 12, a display unit 14, a print performing unit 16, a scan performing unit 18, a wireless interface 20, a wired interface 22, a storage unit 30, and a control unit 50. The operation unit 12 comprises a plurality of keys. A user can input various instructions to the multi-function device 10 by operating the operation unit 12. The display unit 14 is a display for displaying various types of information. The print performing unit 16 is a printing mechanism, such as an ink jet method, laser method, etc. The scan performing unit 18 is a scanning mechanism, such as CCD, CIS, etc. The wireless interface 20 is an interface for performing wireless communication. The wired interface 22 is an interface for performing wired communication.

The storage unit 30 comprises a ROM 32, a NVRAM (non-volatile memory) 36, and a VRAM (volatile memory) 40. The ROM 32 stores a program 34 for the control unit 50 to execute various processes. The NVRAM 36 comprises a permanent setting area 38. The permanent setting area 38 stores wireless setting information for the multi-function device 10 to wirelessly communicate FAX data with the telephone device 70. The wireless setting information includes authentication method, encryption method, password, etc. A state of specific wireless setting information being stored in the permanent setting area 38 is a state of the specific wireless setting information being set in the multi-function device 10 as the wireless setting information for the multi-function device 10 to wirelessly communicate FAX data. The VRAM 40 comprises a temporary setting area 42. The temporary setting area 42 temporarily stores an other wireless setting information while a process to change the setting of the wireless setting information stored in the permanent setting area 38 to the other wireless setting information is being performed.

The control unit 50 performs various processes according to the program 34 stored in the ROM 32. Functions of a communication unit 52, first sending unit 54, setting unit 56, trying unit 58, second sending unit 60, and print control unit 62 are realized by the control unit 50 performing the processes according to the program 34. The communication unit 52 performs sending and receiving of FAX data with the telephone device 70. The first sending unit 54 sends, to the telephone device 70, wireless setting information based on various types of information (authentication method, encryption method, password, etc.) input by a setting change operation of the user. The setting unit 56 changes the wireless setting information currently being set in the multi-function device 10 to new wireless setting information, or maintains the wireless setting information currently being set in the multi-function device 10. The trying unit 58 tries to perform wireless communication using the wireless setting information based on the setting change operation of the user. The second sending unit 60 sends, via the AP 6, a connection completion notice (to be described) (a connection completion notice 310 of FIG. 6, a connection completion notice 320 of FIG. 7) to the telephone device 70. The print control unit 62 controls the operation of the print performing unit 16.

(Configuration of Telephone Device 70)

The telephone device 70 is an attachment device of the multi-function device 10. That is, the telephone device 70 is not shipped as an individual unit, but is shipped together with the multi-function device 10. The telephone device 70 comprises a microphone 72, speaker 74, PSTN interface 76, wireless interface 78, control unit 80, and storage unit 90. The PSTN interface 76 is connected with a PSTN (Public Switched Telephone Network) 8, which is a general public network. The wireless interface 78 is an interface for performing wireless communication. The control unit 80 performs various processes according to a program (not shown) stored in the storage unit 90. The storage unit 90 comprises a NVRAM (non-volatile memory) 91 and VRAM (volatile memory) 93. The NVRAM 91 comprises a permanent setting area 92. The permanent setting area 92 stores wireless setting information for the telephone device 70 to wirelessly communicate the FAX data to the multi-function device 10. A state of specific wireless setting information stored in the permanent setting area 92 is a state where the specific wireless setting information is set in the telephone device 70 as the wireless setting information for the telephone device 70 to wirelessly communicate the FAX data. The VRAM 93 comprises a temporary setting area 94. The temporary setting area 94 temporarily stores an other wireless setting information while a process to change the setting of the wireless setting information stored in the permanent setting area 92 to the other wireless setting information is being performed.

The telephone function is realized by the telephone device 70 performing a process. For example, using the telephone device 70, the user of the multi-function device 10 and the telephone device 70 can make a telephone call to an other telephone device connected with the PSTN 8. In this case, the telephone device 70 sends sound data corresponding to sound input to the microphone 72 to the other telephone device via the PSTN interface 76. Further, in the case where sound data sent from the other telephone device is received by the PSTN interface 76, the telephone device 70 outputs sound corresponding to that sound data from the speaker 74.

Further, the FAX function is realized by the multi-function device 10 and the telephone device 70 performing a process together. For example, in the case of the PSTN interface 76 receiving image data (i.e., FAX data), the telephone device 70 wirelessly sends the image data to the multi-function device 10. In the case where the image data sent wirelessly from the telephone device 70 is received by the wireless interface 20, the multi-function device 10 makes the print performing unit 16 print according to the image data. The FAX receiving operation is thereby performed. Further, the multi-function device 10 wirelessly sends, to the telephone device 70, image data (e.g., the FAX data) that was generated by the scan performing unit 18 performing scanning. In the case where the image data sent wirelessly from the multi-function device 10 is received by the wireless interface 78, the telephone device 70 sends the image data to a destination within the PSTN 8 that was specified previously by the user. The FAX sending operation is thereby performed.

(Processes Performed by Devices 10, 70)

Next, the contents of processes performed by the devices 10, 70 will be described with reference to FIGS. 2 to 4. Moreover, in the present embodiment, an example will be described where, in the case where the multi-function device 10 and the telephone device 70 are configured capable of performing the ad-hoc wireless communication, the user performs a setting change operation in the multi-function device 10 to change to the infrastructure wireless setting. That is, an example will be described where the user performs the setting change operation for changing to a state where the wireless communication can be performed not just between the multi-function device 10 and the telephone device 70, but also between the multi-function device 10 and the PCs 4, 5.

In a shipment stage (can also be termed "initial state") of the multi-function device 10 and telephone device 70, same wireless setting information WS1 (described in short as "WS1" below) is stored in advance in both the permanent setting area 38 of the multi-function device 10 and the permanent setting area 92 of the telephone device 70. That is, in the shipment stage, WS1 is set in both the multi-function device 10 and the telephone device 70. WS1 is the wireless setting information for the multi-function device 10 and the telephone device 70 to wirelessly communicate directly, not via the AP 6. That is, WS1 is ad-hoc wireless setting information. Consequently, as shown in FIG. 2, a wireless connection according to WS1 (the ad-hoc wireless connection) is established between the multi-function device 10 and the telephone device 70. In the state where the wireless connection has been established according to WS1, the multi-function device 10 and the telephone device 70 can wirelessly communicate the FAX data.

While the wireless connection remains established according to WS1, the control unit 80 of the telephone device 70 receives FAX data 100 via the PSTN interface 76 (S2). In this case, the control unit 80 sends the FAX data 100 to the multi-function device 10 by utilizing the wireless connection according to WS1 (S4). The communication unit 52 of the multi-function device 10 thereby receives the FAX data 100 utilizing the wireless connection according to WS1 (S6). In this case, the print control unit 62 of the multi-function device 10 makes the print performing unit 16 print using the FAX data 100 (S8). A print medium on which an image represented by the FAX data 100 is formed can thereby be presented to the user. Moreover, in FIG. 2, an example is shown where the FAX data 100 is sent from the telephone device 70 to the multi-function device 10 (i.e., an example of the FAX receiving operation from the PSTN 8). However, in the state where the wireless connection remains established according to WS1, the FAX data (i.e., the FAX data generated by the scan performing unit 18) can also be sent from the multi-function device 10 to the telephone device 70. That is, the FAX sending operation to the PSTN 8 can also be performed.

By performing the setting change operation on the operation unit 12 of the multi-function device 10, the user inputs an instruction to the multi-function device 10 to change WS1 stored in the permanent setting area 38 to differing wireless setting information WS2 (described in short as "WS2" below) (S10). The setting change operation includes operations for inputting all types of information (authentication method, encryption method, password, etc.) included in WS2. In the present embodiment, WS2 is the wireless setting information for the multi-function device 10 and the telephone device 70 to wirelessly communicate indirectly via the AP 6. That is, WS2 is the infrastructure wireless setting information. In the case where the aforementioned instruction is input, the setting unit 56 stores WS2 in the temporary setting area 42 while WS1 is in a state of being maintained in the permanent setting area 38 (S12). In S12, further, the setting unit 56 determines that the wireless connection must be established using WS2 stored in the temporary setting area 42 instead of WS1 stored in the permanent setting area 38. The wireless connection according to WS1 between the multi-function device 10 and the telephone device 70 is thereby disconnected (S14). Next, the trying unit 58 wirelessly sends a connection requirement 102 to the AP 6 to establish a wireless connection with the AP 6 according to WS2 (S16). The connection requirement 102 includes information (authentication method, encryption method, authentication data needed for authentication, etc) based on WS2.

Upon receiving the connection requirement 102, the AP 6 performs authentication based on the connection requirement 102 (S18). This authentication includes, e.g., authentication concerning whether the authentication method and encryption method included in WS2 are supported by the AP 6, authentication concerning whether the password included in WS2 is registered in the AP 6, etc. Consequently, in order for the authentication of S18 to succeed, the user must input an authentication method and encryption method supported by the AP 6 when performing the operation of S10. Further, in order for the authentication of S18 to succeed, the user must register a specific password in advance in the AP 6 before performing the operation of S10, and must input the same password as the specific password when performing the operation of S10.

In the case where the authentication of S18 has failed, the AP 6 wirelessly sends to the multi-function device 10 an NG notice 104 indicating that the authentication has failed. Examples of the authentication of S18 failing are the user failing to input the authentication method and encryption method supported by the AP 6 when performing the operation of S10, the user inputting a password different from the specific password registered in advance in the AP 6, etc. The setting unit 56 receives the NG notice 104 (S20). In this case, the control unit 50 of the multi-function device 10 displays a screen on the display unit 14 indicating that the setting cannot be changed (S22). Next, the setting unit 56 deletes WS2 stored in the temporary setting area 42, and determines that the wireless connection according to WS1 must be re-established (S24). In this case, the multi-function device 10 maintains WS1 without changing the setting from WS1 to WS2, and the telephone device 70 also maintains WS1. The wireless connection according to WS1 is thereby re-established between the multi-function device 10 and the telephone device 70 (S26).

Moreover, the AP 6 cannot receive the connection requirement 102 in a case where e.g., a power of the AP 6 is OFF when the multi-function device 10 sends the connection requirement 102 in S16. Further, the AP 6 also cannot receive the connection requirement 102 in a case where e.g., a distance between the AP 6 and multi-function device 10 is large. In these cases, the AP 6 cannot perform the authentication of S18, and does not send information indicating an authentication result (the NG notice 104, or an OK notice 110 of FIG. 3 (to be described)) to the multi-function device 10. In such circumstances, the multi-function device 10 and the telephone device 70 cannot communicate wirelessly via the AP 6 even though the setting was changed from WS1 to WS2. Consequently, although not shown, in the case of not receiving the NG notice 104 or the OK notice 110 even though a predetermined time has elapsed since the connection requirement 102 was sent in S16, the setting unit 56 performs the processes S22 to S26.

Figure 3:
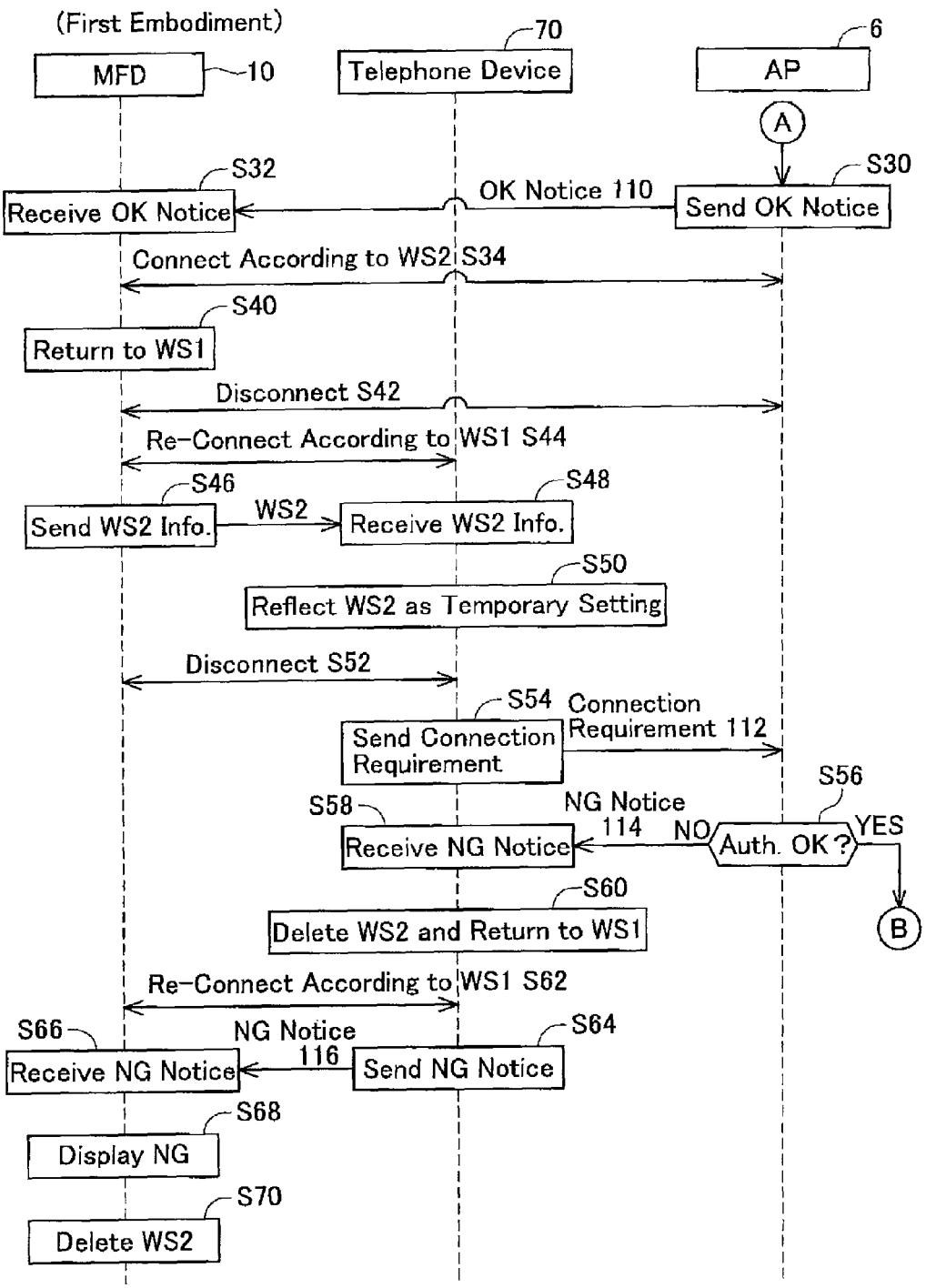
FIG. 3 shows the sequence view continuing from FIG. 2.

In the case where the authentication of S18 has succeeded, as shown in FIG. 3, the AP 6 wirelessly sends the OK notice 110 indicating that authentication has succeeded to the multi-function device 10. The setting unit 56 thereby receives the OK notice 110 (S32). In this case, a wireless connection according to WS2 is established between the multi-function device 10 and the AP 6 (S34). Next, the setting unit 56 determines that the wireless connection according to WS1 must be re-established instead of the wireless connection according to WS2 (S40). The wireless connection according to WS2 established between the multi-function device 10 and the AP 6 is thereby disconnected (S42). Next, the wireless connection according to WS1 is re-established between the multi-function device 10 and the telephone device 70 (S44). Next, the first sending unit 54 sends WS2 to the telephone device 70 using the re-established wireless connection according to WS1 (S46). The control unit 80 of the telephone device 70 thereby receives WS2 (S48).

Upon receiving WS2, the control unit 80 of the telephone device 70 stores (reflects) WS2 in the temporary setting area 94 while WS1 is in the state of being maintained in the permanent setting area 92 (S50). In S50, further, the control unit 80 determines that the wireless connection must be established using WS2 stored in the temporary setting area 94 instead of WS1 stored in the permanent setting area 92. The wireless connection according to WS1 is thereby disconnected (S52). Next, the control unit 80 of the telephone device 70 wirelessly sends, to the AP 6, a connection requirement 112 that includes information based on WS2 in order to establish a wireless connection according to WS2 with the AP 6 (S54).

Upon receiving the connection requirement 112, the AP 6 performs authentication based on the connection requirement 112 (S56). This authentication is the same as that of S18 of FIG. 2. Consequently, in the case where the authentication of S18 succeeds, the authentication of S56 usually succeeds. However, e.g., in the case where information for inhibiting the establishment of the wireless connection between the AP 6 and the telephone device 70 has been registered in advance in the AP 6 (e.g., a case where a MAC address of the telephone device 70 has been registered in advance in the AP 6 as a MAC address that inhibits the establishment of the wireless connection), the authentication of S56 may fail. In this case, the AP 6 wirelessly sends an NG notice 114 indicating the authentication has failed to the telephone device 70. The control unit 80 of the telephone device 70 thereby receives the NG notice 114 (S58). In this case, the control unit 80 deletes WS2 stored in the temporary setting area 94, and determines that the wireless connection according to WS1 must be re-established (S60). The wireless connection according to WS1 is thereby re-established between the multi-function device 10 and the telephone device 70 (S62). Further, using the re-established wireless connection according to WS1, the control unit 80 sends an NG notice 116 indicating that the authentication has failed to the multi-function device 10 (S64). The setting unit 56 thereby receives the NG notice 116 (S66). In this case, the control unit 50 of the multi-function device 10 displays a screen on the display unit 14 indicating that the setting cannot be changed (S68). Further, the setting unit 56 deletes WS2 stored in the temporary setting area 42 (S70). In this case, the multi-function device 10 maintains WS1 without changing the setting from WS1 to WS2, and the telephone device 70 also maintains WS1.

Figure 2:
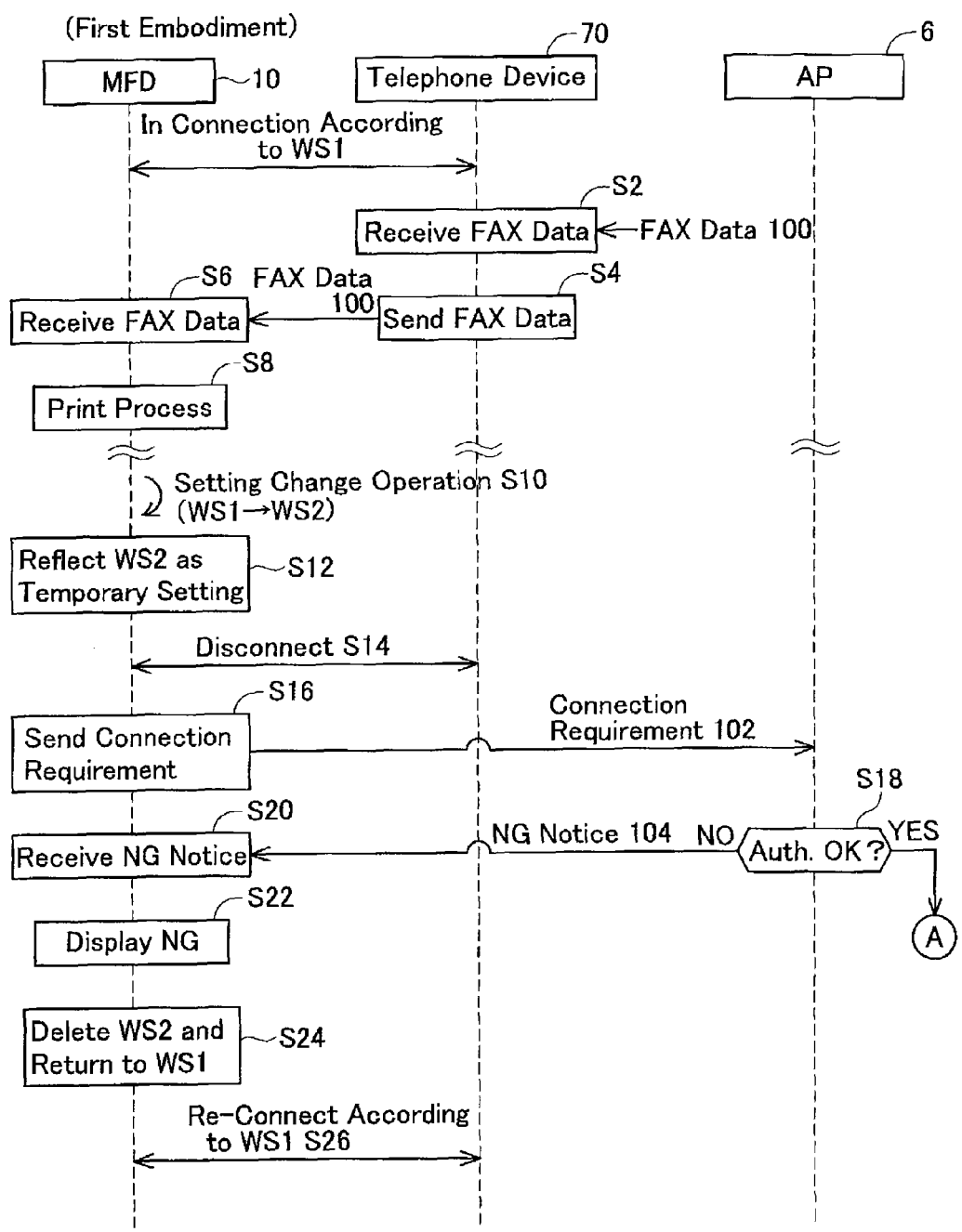
FIG. 2 shows a sequence view of processes performed by devices of a first embodiment.

Moreover, the AP 6 cannot receive the connection requirement 112 in a case where the power of the AP 6 is ON when the multi-function device 10 sends the connection requirement 102 in S16 of FIG. 2, but the power of the AP 6 is OFF when the telephone device 70 sends the connection requirement 112 in S54 of FIG. 3. Further, the AP 6 also cannot receive the connection requirement 112 in a case where e.g., a distance between the AP 6 and the telephone device 70 is large. Although not shown, taking these cases into account, in the case of not receiving the NG notice 114 or an OK notice 120 (to be described) (see FIG. 4) even though a predetermined time has elapsed since the connection requirement 112 was sent in S54, the control unit 80 of the telephone device 70 performs the processes S60-S64.

Figure 4:
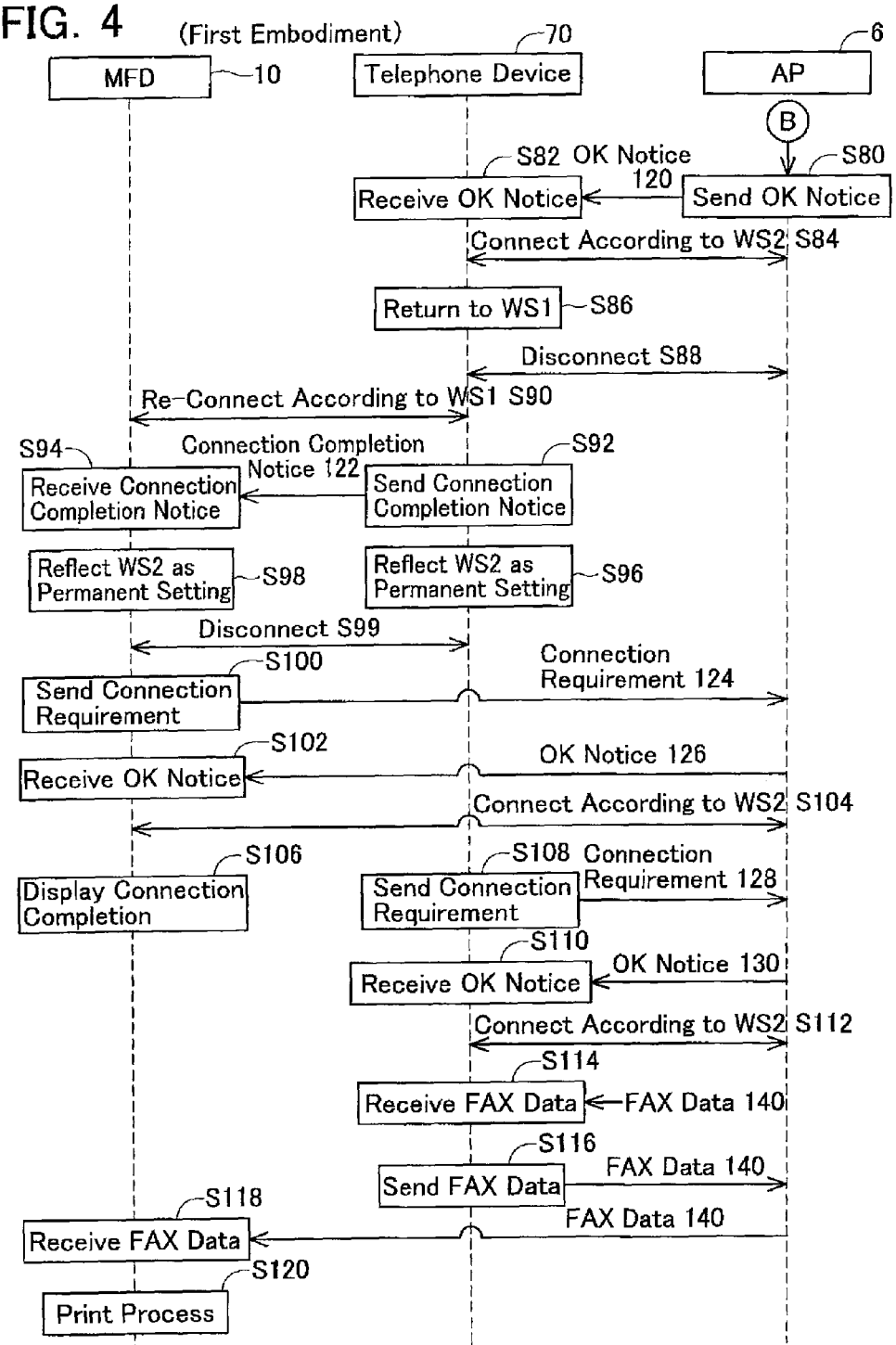
FIG. 4 shows the sequence view continuing from FIG. 3.

In the case where the authentication of S56 has succeeded, as shown in FIG. 4, the AP 6 wirelessly sends the OK notice 120 indicating that the authentication has succeeded to the telephone device 70. The control unit 80 of the telephone device 70 thereby receives the OK notice 120 (S82). In this case, the wireless connection according to WS2 is established between the telephone device 70 and the AP 6 (S84). Next, the control unit 80 determines that the wireless connection according to WS1 must be re-established instead of the wireless connection according to WS2 (S86). The wireless connection according to WS2 established between the telephone device 70 and the AP 6 is thereby disconnected (S88). Further, the wireless connection according to WS1 is re-established between the multi-function device 10 and the telephone device 70 (S90). Next, using the re-established wireless connection according to WS1, the control unit 80 sends a connection completion notice 122 to the multi-function device 10 indicating that the wireless connection with the AP 6 has been established (S92). Further, the control unit 80 deletes WS1 stored in the permanent setting area 92, and newly stores WS2 in the permanent setting area 92 (S96). The telephone device 70 thereby newly sets WS2 in the telephone device 70 as the wireless setting information for the telephone device 70 to wirelessly communicate FAX data. That is, the connection completion notice 122 sent in S92 is a notice sent when the setting of the telephone device 70 changes from WS1 to WS2.

The setting unit 56 of the multi-function device 10 receives the connection completion notice 122 from the telephone device 70 (S94). In this case, the setting unit 56 deletes WS1 stored in the permanent setting area 38, and newly stores WS2 in the permanent setting area 38 (S98). The multi-function device 10 thereby newly sets WS2 in the multi-function device 10 as the wireless setting information for the multi-function device 10 to wirelessly communicate FAX data.

When S96 and S98 end, the wireless connection according to WS1 is disconnected (S99). Next, the trying unit 58 wirelessly sends a connection requirement 124 that includes information based on WS2 to the AP 6 in order to establish a wireless connection according to WS2 with the AP 6 (S100). Since the authentication of S18 of FIG. 2 has been successful once, the AP 6 usually wirelessly sends an OK notice 126 to the multi-function device 10. The setting unit 56 thereby receives the OK notice 126 (S102). The wireless connection according to WS2 is thereby established between the multi-function device 10 and the AP 6 (S104). In this case, the control unit 50 of the multi-function device 10 displays a screen on the display unit 14 indicating that the wireless connection with the AP 6 has been established (S106).

Further, the control unit 80 of the telephone device 70 wirelessly sends, to the AP 6, a connection requirement 128 that includes information based on WS2 in order to establish a wireless connection with the AP 6 according to WS2 (S108). Since the authentication of S56 of FIG. 3 has been successful once, the AP 6 usually wirelessly sends an OK notice 130 to the telephone device 70. The control unit 80 thereby receives the OK notice 130 (S110). The wireless connection according to WS2 is thereby established between the telephone device 70 and the AP 6 (S112).

As described above, the wireless connection according to WS2 is established between the multi-function device 10 and the AP 6 (S104), and the wireless connection according to WS2 is established between the telephone device 70 and the AP 6 (S112). In this state, the multi-function device 10 and the telephone device 70 can wirelessly communicate FAX data via the AP 6. For example, the control unit 80 of the telephone device 70 receives FAX data 140 via the PSTN interface 76 (S114). In this case, utilizing the wireless connection according to WS2, the control unit 80 sends the FAX data 140 to the multi-function device 10 via the AP 6 (S116). Utilizing the wireless connection according to WS2, the communication unit 52 thereby receives the FAX data 140 (S118). In this case, using the FAX data 140, the print control unit 62 makes the print performing unit 16 print (S120). Moreover, in FIG. 4, an example was described of an operation of receiving a FAX from the PSTN 8. However, in the state where the wireless connection according to WS2 has been established, an operation of sending a FAX to the PSTN 8 can also be performed.

The wireless communication system 2 of the first embodiment has been described in detail. For example, a configuration may be considered in which the multi-function device 10 changes the wireless setting information for wirelessly communicating the FAX data (the wireless setting information within the permanent setting area 38) from WS1 to WS2 (termed "comparative example configuration" below) after the multi-function device 10 has sent WS2 to the telephone device 70 (after S46 of FIG. 3), regardless of whether the connection completion notice 122 of FIG. 4 is received. In the above comparative example configuration, the phenomenon where the multi-function device 10 changes the setting from WS1 to WS2, but the telephone device 70 maintains WS1 without changing the setting may occur (e.g., in the case where the NG notice 114 of FIG. 3 is received, or in the case where neither the NG notice 114 of FIG. 3 nor the OK notice 120 of FIG. 4 is received). In this case, since differing wireless setting information is set in the multi-function device 10 and the telephone device 70, the multi-function device 10 and the telephone device 70 cannot communicate the FAX data wirelessly. That is, the FAX receiving operation and the FAX sending operation cannot be realized. In order to inhibit occurrence of such a problem, in the present embodiment, when the telephone device 70 changes the wireless setting information for wirelessly communicating the FAX data (the wireless setting information within the permanent setting area 92) from WS1 to WS2, the telephone device 70 sends the connection completion notice 122 to the multi-function device 10 (S92 of FIG. 4). In the case of receiving the connection completion notice 122 from the telephone device 70, the multi-function device 10 changes the setting from WS1 to WS2 (S98 of FIG. 4). By contrast, in the case of not receiving the connection completion notice 122 (the case where the NG notice 114 of FIG. 3 is received, or the case where neither the NG notice 114 nor the connection completion notice 122 is received), the multi-function device 10 maintains WS1 without changing the setting from WS1 to WS2. It is thereby possible to inhibit differing wireless setting information being set in the multi-function device 10 and the telephone device 70. Consequently, compared to the comparative example configuration, the occurrence of the phenomenon where the multi-function device 10 and the telephone device 70 cannot wirelessly communicate the FAX data can be inhibited.

Further, in the case where the setting of the multi-function device 10 is changed from WS1 to WS2, the setting of the telephone device 70 is also changed from WS1 to WS2 (S96, S98 of FIG. 4). That is, the user can change the setting of the telephone device 70 without even performing the setting change operation on the telephone device 70. Even if an operability of the telephone device 70 is inferior due to reasons such as a display unit (not shown) of the telephone device 70 being smaller than the display unit 14 of the multi-function device 10, etc., the user can change the setting of the telephone device 70 using a user interface which is easier to perform setting (i.e., the user interface of the multi-function device 10).

Further, before the setting of the multi-function device 10 is changed from WS1 to WS2, the multi-function device 10 tries to establish a wireless connection with the AP 6 according to WS2 (S16 of FIG. 2). In the case of receiving the OK notice 110 of FIG. 3 from the AP 6, and of receiving the connection completion notice 122, the setting of the multi-function device 10 is changed from WS1 to WS2. In the case where the establishment of the wireless connection according to WS2 between the multi-function device 10 and the AP 6 is confirmed, it is possible to effectively inhibit the occurrence of the phenomenon where the multi-function device 10 and the telephone device 70 cannot wirelessly communicate the FAX data due to the setting thereof having been changed from WS1 to WS2.

Moreover, in the case where the OK notice 110 of FIG. 3 is not received from the AP 6 (the case where the NG notice 104 of FIG. 2 is received, or the case where neither the NG notice 104 of FIG. 2 nor the OK notice 110 of FIG. 3 is received), the multi-function device 10 does not perform the process S46 of FIG. 3 for sending WS2 to the telephone device 70. Consequently, since the telephone device 70 does not receive WS2, the telephone device 70 maintains WS1 without changing the setting from WS1 to WS2. In this case, since the multi-function device 10 also maintains WS1, the multi-function device 10 and the telephone device 70 can wirelessly communicate the FAX data utilizing the wireless connection according to WS1.

Further, in the present embodiment, before changing the setting from WS1 to WS2, the telephone device 70 tries to establish a wireless connection according to WS2 with the AP 6 (S54 of FIG. 3). Upon receiving the OK notice 120 of FIG. 4 from the AP 6, the telephone device 70 sends the connection completion notice 122 of FIG. 4 to the multi-function device 10. According to this configuration, in the case where the establishment of the wireless connection according to WS2 between the telephone device 70 and the AP 6 is confirmed, the multi-function device 10 can change the setting from WS1 to WS2.

As is clear from the above description, the multi-function device 10 and the telephone device 70 are respectively an example of a "first wireless communication device" and a "second wireless communication device". Further, WS1, WS2 are respectively an example of "first wireless setting information" and "second wireless setting information". The FAX data 100, 140 are examples of "specific data". The connection completion notice 122 of FIG. 4 is an example of a "predetermined signal". Further, the OK notice 110 of FIG. 3, and the OK notice 120 of FIG. 4 are respectively an example of "success information" received by the first wireless communication device, and "success information" received by the second wireless communication device.

Second Embodiment

A second embodiment will be described with reference to FIG. 5. Here, the description will focus upon points differing from the first embodiment. As in the case of the first embodiment, the wireless connection according to WS1 is established between the multi-function device 10 and the telephone device 70. By performing the setting change operation on the operation unit 12 of the multi-function device 10, the user inputs, to the multi-function device 10, the instruction to change WS1 stored in the permanent setting area 38 of the multi-function device 10 to WS2 (S210). In the case where the instruction is input, the setting unit 56 stores WS2 in the temporary setting area 42, and determines that the wireless connection must be established using WS2 instead of WS1 (S212). The wireless connection according to WS1 between the multi-function device 10 and the telephone device 70 is thereby disconnected (S214).

Next, the trying unit 58 wirelessly sends, to the AP 6, a connection requirement 200 that includes information based on WS2 (S216). In this case, the AP 6 performs the same authentication as in the first embodiment and, in the case where authentication has succeeded, wirelessly sends an OK notice 202 to the multi-function device 10. Moreover, although not shown, in the case where the authentication has failed, the AP 6 wirelessly sends an NG notice to the multi-function device 10, as in the first embodiment. The process in the case of the multi-function device 10 receiving the NG notice (see S22-S26 of FIG. 2) is the same as in the first embodiment. Further, the process in the case of the multi-function device 10 receiving neither the NG notice nor the OK notice 202 (see S22-S26 of FIG. 2) is also the same as in the first embodiment.

In the case where the setting unit 56 receives the OK notice 202 (S232), the wireless connection according to WS2 is established between the multi-function device 10 and the AP 6 (S234). Next, the setting unit 56 determines that the wireless connection according to WS1 must be re-established instead of the wireless connection according to WS2 (S240). The wireless connection according to WS2 established between the multi-function device 10 and the AP 6 is thereby disconnected (S242). Further, the wireless connection according to WS1 is re-established between the multi-function device 10 and the telephone device 70 (S244). Next, using the re-established wireless connection according to WS1, the first sending unit 54 sends WS2 to the telephone device 70 (S246). Moreover, in the second embodiment, the processes until S246 are approximately the same as those of the first embodiment. Below, points differing from the first embodiment will be described.

The telephone device 70 cannot receive WS2 e.g. in the case where the power of the telephone device 70 is OFF when WS2 is sent from the multi-function device 10 to the telephone device 70 (when S246 is performed). Taking this type of case into account, the setting unit 56 monitors whether a response is received from the telephone device 70 until a predetermined time elapses since WS2 was sent in S246 (S250). In the case where a response is not received even though the predetermined time has elapsed, the control unit 50 displays the screen on the display unit 14 indicating that the setting cannot be changed (S252). Further, the setting unit 56 deletes WS2 stored in the temporary setting area 42 (S254). In this case, the multi-function device 10 maintains WS1 without changing the setting from WS1 to WS2, and the telephone device 70 also maintains WS1.

In the case where WS2 is received, the control unit 80 of the telephone device 70 utilizes the wireless connection according to WS1 to send the multi-function device 10 a reception completion notice 212 indicating WS2 has been received (S292). In this case, the control unit 80 deletes WS1 stored in the permanent setting area 92, and newly stores WS2 in the permanent setting area 92 (S296). WS2 is thereby newly set in the telephone device 70 as the wireless setting information for the telephone device 70 to wirelessly communicate the FAX data. That is, the reception completion notice 212 sent in S292 is a notice sent when the telephone device 70 changes the setting from WS1 to WS2.

The setting unit 56 of the multi-function device 10 receives the reception completion notice 212 from the telephone device 70 (S294). In this case, the setting unit 56 deletes WS1 stored in the permanent setting area 38, and newly stores WS2 in the permanent setting area 38 (S298). WS2 is thereby newly set in the multi-function device 10 as the wireless setting information for the multi-function device 10 to wirelessly communicate FAX data. Moreover, although not shown, after S296, the control unit 80 of the telephone device 70 performs the processes S108, S110 of FIG. 4, as in the first embodiment. The wireless connection according to WS2 is thereby established between the telephone device 70 and the AP 6. Further, after S298, the trying unit 58 of the multi-function device 10 performs the processes S100, S102, S106 of FIG. 4, as in the first embodiment. A wireless connection according to WS2 is thereby established between the multi-function device 10 and the AP 6. Consequently, the multi-function device 10 and the telephone device 70 reach the state of being able to wirelessly communicate the FAX data via the AP 6. Moreover, in the second embodiment, the case is described, as an example, where the authentication succeeds when the telephone device 70 performs the connection requirement with the AP 6.

The wireless communication system 2 of the second embodiment was described in detail. In the present embodiment, when the telephone device 70 changes the wireless setting information for wirelessly communicating FAX data (the wireless setting information in the permanent setting area 92) from WS1 to WS2, the telephone device 70 sends the reception completion notice 212 to the multi-function device 10 (S292). Upon receiving the reception completion notice 212 from the telephone device 70, the multi-function device 10 changes the setting from WS1 to WS2 (S298). By contrast, in the case of not receiving the reception completion notice 212, the multi-function device 10 maintains WS1 without changing the setting from WS1 to WS2 (S254). It is thereby possible to inhibit differing wireless setting information being set in the multi-function device 10 and the telephone device 70. Consequently, occurrence of the phenomenon where the multi-function device 10 and the telephone device 70 cannot wirelessly communicate the FAX data can be inhibited compared to the configuration where, regardless of whether the reception completion notice 212 of FIG. 5 is received, the multi-function device 10 changes the wireless setting information for wirelessly communicating the FAX data (the wireless setting information in the permanent setting area 38) from WS1 to WS2 after having sent WS2 to the telephone device 70 (after S246 of FIG. 5). Moreover, in the present embodiment, the reception completion notice 212 is an example of the "predetermined signal".

Third Embodiment

A third embodiment will be described with reference to FIG. 6 and FIG. 7. Here, the description will focus upon points differing from the first and second embodiments. As with the first embodiment, the wireless connection according to WS1 is established between the multi-function device 10 and the telephone device 70. By performing the setting change operation on the operation unit 12 of the multi-function device 10, the user inputs, to the multi-function device 10, the instruction to change WS1 stored in the permanent setting area 38 of the multi-function device 10 to WS2 (S310). Moreover, in the third embodiment, the processes until S310 are approximately the same as in the first and second embodiments. Below, points differing from the first and second embodiments will be described. When the user performs the setting change operation (S310), the first sending unit 54 sends WS2 to the telephone device 70 utilizing the wireless connection according to WS1 (S312). Moreover, although not shown, as in the processes of S250-S254 of FIG. 5 of the second embodiment, the multi-function device 10 maintains WS1 without changing the setting from WS1 to WS2 in the case where a response to sending WS2 is not received.

The control unit 80 of the telephone device 70 receives WS2 (S314). Upon receiving WS2, the control unit 80 utilizes the wireless connection according to WS1 to send the multi-function device 10 a reception completion notice 302 indicating that WS2 has been received (S316). In this case, the control unit 80 stores WS2 in the temporary setting area 94, and determines that the wireless connection must be established using WS2 instead of WS1 (S322). The setting unit 56 of the multi-function device 10 receives the reception completion notice 302 (S318). In this case, the setting unit 56 stores WS2 in the temporary setting area 42, and determines that the wireless connection must be established using WS2 instead of WS1 (S320). The wireless connection according to WS1 between the multi-function device 10 and the telephone device 70 is thereby disconnected (S324).

Next, the trying unit 58 wirelessly sends, to the AP 6, a connection requirement 304 that includes information based on WS2 (S326). In this case, the AP 6 performs authentication identical to that of the first embodiment, and in the case of authentication succeeding, wirelessly sends an OK notice to the multi-function device 10. Further, the control unit 80 of the telephone device 70 also wirelessly sends, to the AP 6, a connection requirement 306 that includes information based on WS2 (S328). In this case, the AP 6 performs authentication identical to that of the first embodiment, and in the case of the authentication succeeding, wirelessly sends an OK notice to the telephone device 70. Moreover, pattern 1 of FIG. 6 shows processes performed in the case where both the multi-function device 10 and telephone device 70 receive the OK notice. Further, pattern 2 of FIG. 7 shows processes performed in the case where only the multi-function device 10 receives the OK notice, and pattern 3 shows processes performed in the case where only the telephone device 70 receives the OK notice.

(Pattern 1)

As shown in pattern 1 of FIG. 6, in the case where both the multi-function device 10 and telephone device 70 receive the OK notice, the wireless connection according to WS2 is established between the multi-function device 10 and the AP 6 (S340), and the wireless connection according to WS2 is established between the telephone device 70 and the AP 6 (S342). In the case of receiving the OK notice from the AP 6, the second sending unit 60 of the multi-function device 10 sends the connection completion notice 310 to the telephone device 70 via the AP 6 utilizing the wireless connection according to WS2 (S344). The control unit 80 of the telephone device 70 thereby receives the connection completion notice 310 (S346). In this case, the control unit 80 sends a reception completion notice 312, indicating that the connection completion notice 310 has been received, to the multi-function device 10 via the AP 6 utilizing the wireless connection according to WS2 (S348). Further, the control unit 80 deletes WS1 stored in the permanent setting area 92, and newly stores WS2 in the permanent setting area 92 (S354). WS2 is thereby newly set in the telephone device 70 as the wireless setting information for the telephone device 70 to wirelessly communicate FAX data. That is, the reception completion notice 312 sent in S348 is a notice sent when the telephone device 70 changes the setting from WS1 to WS2.

The setting unit 56 of the multi-function device 10 receives the reception completion notice 312 (S350). In this case, the setting unit 56 deletes WS1 stored in the permanent setting area 38, and newly stores WS2 in the permanent setting area 38 (S352). WS2 is thereby newly set in the multi-function device 10 as the wireless setting information for the multi-function device 10 to wirelessly communicate FAX data. The multi-function device 10 and the telephone device 70 can wirelessly communicate FAX data via the AP 6 utilizing the wireless connection according to WS2 established in S340 and S342.

(Pattern 2)

As shown in pattern 2 of FIG. 7, in the case where only the multi-function device 10 receives the OK notice, the wireless connection according to WS2 is established between the multi-function device 10 and the AP 6 (S360), but the wireless connection according to WS2 is not established between the telephone device 70 and the AP 6. In the case where the OK notice from the AP 6 is not received (in the case where the NG notice is received, or in the case where neither the NG notice nor the OK notice is received), the control unit 80 of the telephone device 70 deletes WS2 stored in the temporary setting area 94, and determines that the wireless connection must be established according to WS1 (S362). However, at this point, a wireless connection according to WS1 is not established between the multi-function device 10 and the telephone device 70. This is because the multi-function device 10 has established the wireless connection according to WS2 with the AP 6.

As in the case of pattern 1, the second sending unit 60 of the multi-function device 10 utilizes the wireless connection according to WS2 to send the connection completion notice 320 to the telephone device 70 via the AP 6 (S364). However, as described above, since a wireless connection according to WS2 is not established between the telephone device 70 and the AP 6, the telephone device 70 cannot receive the connection completion notice 320, and consequently does not send a reception completion notice to the multi-function device 10. Taking this type of case into account, the setting unit 56 monitors whether a response is received from the telephone device 70 until a predetermined time elapses since the connection completion notice 320 was sent in S364 (S366). In pattern 2, since a response is not received even though the predetermined time has elapsed, the control unit 50 displays a screen on the display unit 14 indicating that the setting cannot be changed (S368). Further, the setting unit 56 deletes WS2 stored in the temporary setting area 42, and determines that the wireless connection according to WS1 must be re-established (S370). Thereby, in the case of pattern 2, the multi-function device 10 maintains WS1 without changing the setting from WS1 to WS2, and the telephone device 70 also maintains WS1. Consequently, the wireless connection according to WS1 is re-established between the multi-function device 10 and the telephone device 70 (S372).

(Pattern 3)

As shown in pattern 3 of FIG. 7, in the case where only the telephone device 70 receives the OK notice, the wireless connection according to WS2 is established between the telephone device 70 and the AP 6 (S380), but the wireless connection according to WS2 is not established between the multi-function device 10 and the AP 6. In the case where the OK notice from the AP 6 is not received (in the case where the NG notice is received, or in the case where neither the NG notice nor the OK notice is received), the control unit 50 of the multi-function device 10 displays the screen on the display unit 14 indicating that the setting cannot be changed (S384). Further, the setting unit 56 deletes WS2 stored in the temporary setting area 42, and determines that the wireless connection according to WS1 must be re-established (S386). However, at this point, a wireless connection according to WS1 is not established between the multi-function device 10 and the telephone device 70. This is because the telephone device 70 has established the wireless connection according to WS2 with the AP 6.

As described above, in the case of pattern 3, the multi-function device 10 cannot send a connection completion notice to the telephone device 70 via the AP 6 utilizing a wireless connection according to WS2. Taking this type of case into account, the control unit 80 of the telephone device 70 monitors whether the connection completion notice is received from the multi-function device 10 until a predetermined time elapses since the OK notice was received from the AP 6 (S382). In pattern 3, since the connection completion notice is not received even though the predetermined time has elapsed, the control unit 80 deletes WS2 stored in the temporary setting area 94, and determines that the wireless connection according to WS1 must be re-established (S388). Thereby, in the case of pattern 3, the multi-function device 10 maintains WS1 without changing the setting from WS1 to WS2, and the telephone device 70 also maintains WS1. Consequently, the wireless connection according to WS1 is re-established between the multi-function device 10 and the telephone device 70 (S390).

(Pattern 4)

Moreover, although not shown, a pattern can be obtained where neither the multi-function device 10 nor the telephone device 70 receives the OK notice. In this case, similar to the pattern 3, the setting unit 56 of the multi-function device 10 deletes WS2 stored in the temporary setting area 42, and determines that the wireless connection according to WS1 must be re-established (S386). Further, similar to the pattern 2, the control unit 80 of the telephone device 70 deletes WS2 stored in the temporary setting area 94, and determines that the wireless connection according to WS1 must be re-established (S362). Thereby, in the case of pattern 4, the multi-function device 10 maintains WS1 without changing the setting from WS1 to WS2, and the telephone device 70 also maintains WS1. Consequently, the wireless connection according to WS1 is re-established between the multi-function device 10 and the telephone device 70.

The wireless communication system 2 of the third embodiment was described in detail. In the present embodiment, when changing the wireless setting information for wirelessly communicating FAX data (the wireless setting information in the permanent setting area 92) from WS1 to WS2, the telephone device 70 sends the reception completion notice 312 to the multi-function device 10 (S348 of FIG. 6). Upon receiving the reception completion notice 312 from the telephone device 70, the multi-function device 10 changes the setting from WS1 to WS2 (S352 of FIG. 6). By contrast, in the case of not receiving the reception completion notice 312 (the case of pattern 2 through pattern 4), the multi-function device 10 maintains WS1 without changing the setting from WS1 to WS2. Further, in the case of pattern 2 through pattern 4, the telephone device 70 also maintains WS1. It is thereby possible to inhibit differing wireless setting information to be set in the multi-function device 10 and telephone device 70. Consequently, occurrence of the phenomenon where the multi-function device 10 and the telephone device 70 cannot wirelessly communicate FAX data can be inhibited compared to the configuration where, regardless of whether the reception completion notice 312 of FIG. 6 is received, the multi-function device 10 changes the wireless setting information for wirelessly communicating the FAX data (the wireless setting information in the permanent setting area 38) from WS1 to WS2.

Further, in the present embodiment, the multi-function device 10 receives the reception completion notice 312 from the telephone device 70 via the AP 6 utilizing the wireless connection according to WS2. The multi-function device 10 receiving the reception completion notice 312 means that the multi-function device 10 and the telephone device 70 can wirelessly communicate according to WS2. That is, according to the present embodiment, the setting can be changed from WS1 to WS2 in the multi-function device 10 in the case where it is confirmed that the multi-function device 10 and the telephone device 70 can wirelessly communicate according to WS2. Moreover, in the present embodiment, the reception completion notice 312 is an example of the "predetermined signal". Further, the connection completion notice 310 is an example of the "specific signal".

(Variant of the Third Embodiment)

In the third embodiment, upon receiving the OK notice from the AP 6, the multi-function device 10 sends the connection completion notice 310 to the telephone device 70 and, upon the telephone device 70 receiving the connection completion notice 310, the telephone device 70 sends the reception completion notice 312 to the multi-function device 10. In the present variant, a configuration opposite to that of the third embodiment is adopted. That is, in the case of the control unit 80 of the telephone device 70 receiving the OK notice from the AP 6, the control unit 80 of the telephone device 70 utilizes the wireless connection according to WS2 to send the connection completion notice to the telephone device 70 via the AP 6. Upon receiving the connection completion notice, the second sending unit 60 of the multi-function device 10 utilizes the wireless connection according to WS2 to send the reception completion notice to the telephone device 70 via the AP 6. In the case of the setting unit 56 of the multi-function device 10 receiving the connection completion notice from the telephone device 70, the setting unit 56 of the multi-function device 10 deletes WS1 stored in the permanent setting area 38, and newly stores WS2 in the permanent setting area 38. WS2 is thereby newly set in the multi-function device 10 as the wireless setting information for the multi-function device 10 to wirelessly communicate FAX data. Further, in the case of the control unit 80 of the telephone device 70 receiving the reception completion notice from the multi-function device 10, the control unit 80 of the telephone device 70 deletes WS1 stored in the permanent setting area 92, and newly stores WS2 in the permanent setting area 92. WS2 is thereby newly set in the telephone device 70 as the wireless setting information for the telephone device 70 to wirelessly communicate FAX data. In the present variant, the connection completion notice sent from the telephone device 70 to the multi-function device 10 is an example of the "predetermined signal".

Variants of the aforementioned embodiments are given below.

(1) The aforementioned embodiments teach examples in which the setting is changed from the ad-hoc wireless setting information WS1 to the infrastructure wireless setting information WS2. However, the technique of the aforementioned embodiments can also be applied to a configuration in which the setting is changed from the infrastructure wireless setting information WS2 to the ad-hoc wireless setting information WS1. Further, the technique can also be applied to a configuration in which the setting is changed from the infrastructure wireless setting information WS2 to infrastructure wireless setting information WS3. Similarly, the technique of the aforementioned embodiments can also be applied to a case of changing the setting from the ad-hoc wireless setting information WS1 to ad-hoc wireless setting information WS4. Moreover, in the case of changing the setting from WS2 to WS1, and in the case of changing the setting from WS1 to WS4, a process of trying to wirelessly connect with the AP 6 (e.g., S16 of FIG. 2, S54 of FIG. 3, etc.) is not performed. That is, in the case where the telephone device 70 receives WS1, the telephone device 70 may send the reception completion notice to the multi-function device 10, and change the setting from WS2 to WS1. In the case where the multi-function device 10 receives the reception completion notice, the multi-function device 10 may change its setting from WS2 to WS1. Further, in the case where the telephone device 70 receives WS4, the telephone device 70 may send a reception completion notice to the multi-function device 10, and change its setting from WS1 to WS4. In the case where the multi-function device 10 receives the reception completion notice from the telephone device 70, the multi-function device 10 may change its setting from WS1 to WS4. In the present variant, the reception completion notice sent from the telephone device 70 to the multi-function device 10 is an example of the "predetermined signal".

(2) In the aforementioned embodiments, the target data communicated between the multi-function device 10 and the telephone device 70 is FAX data. That is, generally speaking, the FAX data is an example of the "specific data". However, the "specific data" is not restricted to FAX data, and may be sound data (e.g., sound data of an answering machine), image data other than FAX data communicated via the PSTN 8, or other data (e.g., text data).

Figure 5:
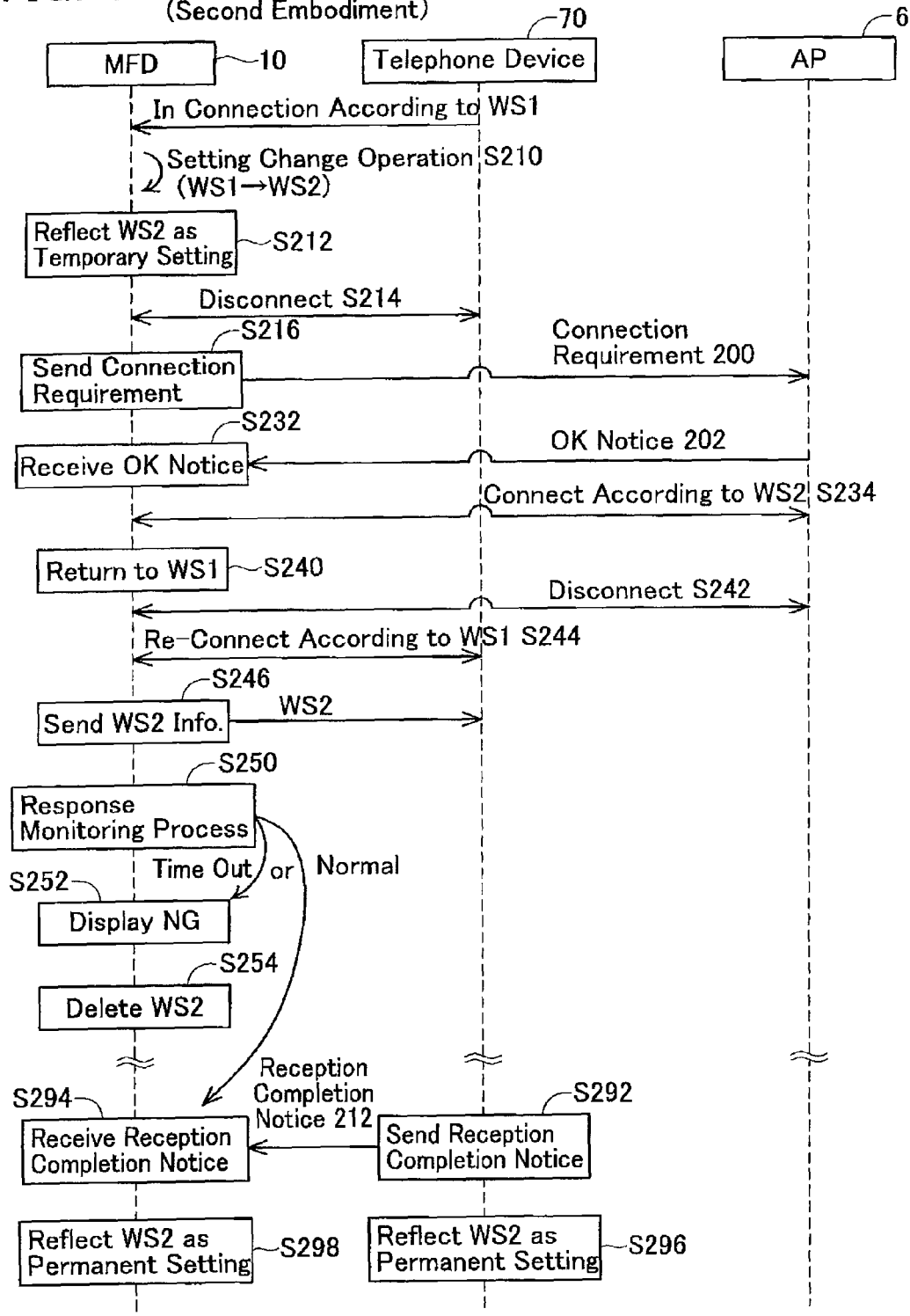
FIG. 5 shows a sequence view of processes performed by devices of a second embodiment.

(3) Further, in the aforementioned embodiments, the setting change operation for inputting WS2 is performed in S10 of FIG. 2, S210 of FIG. 5, and S310 of FIG. 6 via the operation unit 12 of the multi-function device 10. However, e.g., in the case where the multi-function device 10 is connected with a wired LAN via the wired interface 22, the setting change operation for inputting WS2 may be performed via an operation unit of a specific PC (not shown) connected with the wired LAN. In this case, the specific PC may send WS2 to the multi-function device 10 via the wired LAN. In the case where the multi-function device 10 receives the WS2 from the specific PC, the multi-function device 10 may determine that the instruction to change WS1 to WS2 has been input.

(4) Further, in the first embodiment, as shown in FIG. 4, after sending the connection completion notice 122 (after S92), the telephone device 70 changes its setting from WS1 to WS2 (S96). Instead of this configuration, the telephone device 70 may first perform the process S96, and then perform the process S92. Similarly, in the second embodiment, the telephone device 70 may first perform the process S296 of FIG. 5, and then perform the process S292. Similarly, in the third embodiment, the telephone device 70 may first perform the process S354 of FIG. 6, and then perform the process S348. That is, generally speaking, the "predetermined signal" may be sent to the first wireless communication device by the second wireless communication device before the second wireless communication device changes the first wireless setting information to the second wireless setting information, and may be sent to the first wireless communication device after the second wireless communication device has changed the first wireless setting information to the second wireless setting information.

(5) Further, in the first embodiment, it is presupposed that WS2 sent from the multi-function device 10 in S46 of FIG. 3 is received by the telephone device 70 (S48, S50 of FIG. 3). However, as in the second embodiment, upon receiving WS2, the telephone device 70 may send the reception completion notice to the multi-function device 10. Upon the multi-function device 10 receiving the reception completion notice from the telephone device 70, and upon receiving the connection completion notice 122 (S94 of FIG. 4), the multi-function device 10 may perform the process to store WS2 in the permanent setting area 38 (the process S98 of FIG. 4). In the case where the multi-function device 10 does not receive the reception completion notice or does not receive the connection completion notice, the multi-function device 10 need not perform the process to store WS2 in the permanent setting area 38 (the process S98 of FIG. 4).

(6) Further, in the aforementioned embodiments, the case was described as an example where the telephone device 70 is an attachment device of the multi-function device 10, but the embodiments are not limited to this. For example, a PC may be utilized instead of the telephone device 70. Specifically, in the case where the multi-function device 10 and the PC communicate wirelessly according to WS1, the user may perform the setting change operation in the multi-function device 10. Thereby, the multi-function device 10 and the PC may perform the processes of the aforementioned embodiments, and may change the settings. In this case, e.g., print data for the PC to instruct the multi-function device 10 to perform printing is an example of the "specific data".

(7) Further, in the aforementioned embodiments, the case was described as an example where the telephone device 70 is connected to the PSTN 8, but the embodiments are not limited to this. That is, the multi-function device 10 may be connected to the PSTN 8, and the user may perform the setting change operation in the multi-function device 10.

(8) In the foregoing embodiment, respective units 52 to 62 are realized as a result of the control device 50 performing the processes according to the program 34. Nevertheless, at least one unit of respective units 52 to 62 may alternately be realized by a hardware resource such as a logic circuit.

The invention claimed is:

1. A first wireless communication device comprising:
a processor; and
memory storing machine-readable instructions that, when executed by the processor, cause the first wireless communication device to operate as:
a communication unit configured to communicate specific data with a second wireless communication device via a wireless connection according to wireless setting information for communicating the specific data;
a trying unit configured to attempt to establish, in place of a first wireless connection using first wireless setting information, a second wireless connection using second wireless setting information between the first wireless communication device and an access point in a case where an instruction to change the wireless setting information from the first wireless setting information to the second wireless setting information is input;
a first sending unit configured to send the second wireless setting information to the second wireless communication device via the first wireless connection using the first wireless setting information in the case where the instruction is input; and
a setting unit configured to:
set the second wireless setting information as the wireless setting information for communicating the specific data in a case where success information, indicating that the second wireless connection is established, is received from the access point, and a predetermined signal, indicating that setting information of the second wireless communication device is changed from the first wireless setting information to the second wireless setting information, is received from the second wireless communication device, and
maintain the first wireless setting information as the wireless setting information for communicating the specific data in a case where the predetermined signal is not received.

2. The first wireless communication device as in claim 1, wherein
the first sending unit does not send the second wireless setting information to the second wireless communication device in a case where the success information is not received from the access point even if the instruction is input.

3. The first wireless communication device as in claim 1, wherein
in a case where the success information is received from the access point, the first sending unit re-establishes the first wireless connection in place of the second wireless connection which had been established, and sends the second wireless setting information to the second wireless communication device via the first wireless connection which has been re-established.

4. The first wireless communication device as in claim 3, wherein
the setting unit receives the predetermined signal from the second wireless communication device via the first wireless connection which has been re-established.

5. The first wireless communication device as in claim 1, wherein
the predetermined signal is a signal sent from the second wireless communication device to the first wireless communication device when the second wireless communication device receives the second wireless setting information.

6. The first wireless communication device as in claim 1, wherein
the second wireless communication device is an attachment device of the first wireless communication device, and
the first wireless setting information is wireless setting information of an ad-hoc mode in which the first wireless communication device and the second wireless communication device are wirelessly connected and directly communicate without using the access point.

7. The first wireless communication device as in claim 1, wherein the machine-readable instructions, when executed by the processor, cause the first wireless communication device to further operate as:
a print control unit configured to make a print performing unit print an image according to the specific data in a case where the first communication device receives the specific data from the second wireless communication device via the wireless connection using the wireless setting information for communicating the specific data.

8. A non-transitory computer readable storage medium storing machine-executable instructions that, when executed by at least one processor, cause a first wireless communication device to:
communicate specific data with a second wireless communication device via a wireless connection according to wireless setting information for communicating the specific data;
attempt to establish, in place of a first wireless connection using first wireless setting information, a second wireless connection using second wireless setting information between the first wireless communication device and an access point in a case where an instruction to change the wireless setting information from the first wireless setting information to the second wireless setting information is input;
send the second wireless setting information to the second wireless communication device via the first wireless connection using the first wireless setting information in the case where the instruction is input;
set the second wireless setting information as the wireless setting information for communicating the specific data in a case where success information, indicating that the second wireless connection is established, is received from the access point, and a predetermined signal, indicating that setting information of the second wireless communication device is changed from the first wireless setting information to the second wireless setting information, is received from the second wireless communication device; and
maintain the first wireless setting information as the wireless setting information for communicating the specific data in a case where the predetermined signal is not received.

9. A first wireless communication device comprising:
a processor; and
memory storing machine-readable instructions that, when executed by the processor, cause the first wireless communication device to operate as:
a communication unit configured to communicate specific data with a second wireless communication device via a wireless connection according to wireless setting information for communicating the specific data;
a first sending unit configured to send second wireless setting information to the second wireless communication device via a first wireless connection using first wireless setting information in a case where an instruction is input, the instruction including an instruction to change the wireless setting information for communicating the specific data from the first wireless setting information set in the first wireless communication device to the second wireless setting information;
a trying unit configured to attempt to establish, in place of the first wireless connection, a second wireless connection using the second wireless setting information between the first wireless communication device and an access point in a case where the second wireless setting information includes wireless setting information for wirelessly communicating via the access point; and
a setting unit configured to:
set the second wireless setting information as the wireless setting information for communicating the specific data in a case where success information, indicating that the attempt to establish the second wireless connection succeeded, is received from the access point, and a predetermined signal is received, the predetermined signal including a signal sent from the second wireless communication device to the first wireless communication device when the second wireless communication device receives success information from the access point in a case where the second wireless communication device attempts to establish a wireless connection using the second wireless setting information between the second wireless communication device and the access point, and
maintain the first wireless setting information as the wireless setting information for communicating the specific data in a case where the predetermined signal is not received.

10. A non-transitory computer readable storage medium storing machine-executable instructions that, when executed by at least one processor, cause a first wireless communication device to:
communicate specific data with a second wireless communication device via a wireless connection according to wireless setting information for communicating the specific data;
send second wireless setting information to the second wireless communication device via a first wireless connection using first wireless setting information in a case where an instruction is input, the instruction including an instruction to change the wireless setting information for communicating the specific data from the first wireless setting information set in the first wireless communication device to the second wireless setting information;

attempt to establish, in place of the first wireless connection, a second wireless connection using the second wireless setting information between the first wireless communication device and an access point in a case where the second wireless setting information includes wireless setting information for wirelessly communicating via the access point;

set the second wireless setting information as the wireless setting information for communicating the specific data in a case where success information, indicating that the attempt to establish the second wireless connection succeeded, is received from the access point, and a predetermined signal is received, the predetermined signal including a signal sent from the second wireless communication device to the first wireless communication device when the second wireless communication device receives success information from the access point in a case where the second wireless communication device attempts to establish a wireless connection using the second wireless setting information between the second wireless communication device and the access point; and maintain the first wireless setting information as the wireless setting information for communicating the specific data in a case where the predetermined signal is not received.

11. A first wireless communication device comprising:
a processor; and
memory storing machine-readable instructions that, when executed by the processor, cause the first wireless communication device to operate as:
  a communication unit configured to communicate specific data with a second wireless communication device via a wireless connection according to wireless setting information for communicating the specific data;
  a first sending unit configured to send second wireless setting information to the second wireless communication device via a first wireless connection using first wireless setting information in a case where an instruction is input, the instruction including an instruction to change the wireless setting information for communicating the specific data from the first wireless setting information set in the first wireless communication device to the second wireless setting information;
  a trying unit configured to attempt to establish, in place of the first wireless connection, a second wireless connection using the second wireless setting information between the first wireless communication device and an access point in a case where the second wireless setting information includes wireless setting information for wirelessly communicating via the access point; and
  a setting unit configured to:
    set the second wireless setting information as the wireless setting information for communicating the specific data in a case where success information, indicating that the attempt to establish the second wireless connection succeeded, is received from the access point, and a predetermined signal is received from the second wireless communication device via the access point and the second wireless connection which has been established by the trying unit, the predetermined signal including a signal sent from the second wireless communication device to the first wireless communication device via the access point when the second wireless communication device changes its setting information from the first wireless setting information to the second wireless setting information, and
    maintain the first wireless setting information as the wireless setting information for communicating the specific data in a case where the predetermined signal is not received.

12. The first wireless communication device as in claim 11, wherein the machine-readable instructions, when executed by the processor, cause the first wireless communication device to further operate as:
  a second sending unit configured to send, in a case where the success information is received from the access point, a specific signal to the second wireless communication device via the access point and the second wireless connection which has been established by the trying unit,
  wherein the predetermined signal is sent from the second wireless communication device to the first wireless communication device via the access point when the second wireless communication device receives the specific signal.

13. The first wireless communication device as in claim 11, wherein
the predetermined signal is sent from the second wireless communication device to the first wireless communication device via the access point when the second wireless communication device receives success information from the access point in a case where the second wireless communication device attempts to establish a wireless connection using the second wireless setting information between the second wireless communication device and the access point.

14. A non-transitory computer readable storage medium storing machine-executable instructions that, when executed by at least one processor, cause a first wireless communication device to:
  communicate specific data with a second wireless communication device via a wireless connection according to wireless setting information for communicating the specific data;
  send second wireless setting information to the second wireless communication device via a first wireless connection using first wireless setting information in a case where an instruction is input, the instruction including an instruction to change the wireless setting information for communicating the specific data from the first wireless setting information set in the first wireless communication device to the second wireless setting information;
  attempt to establish, in place of the first wireless connection, a second wireless connection using the second wireless setting information between the first wireless communication device and an access point in a case where the second wireless setting information includes wireless setting information for wirelessly communicating via the access point;
  set the second wireless setting information as the wireless setting information for communicating the specific data in a case where success information, indicating that the attempt to establish the second wireless connection succeeded, is received from the access point, and a predetermined signal is received from the second wireless communication device via the access point and the second wireless connection which has been established, the predetermined signal including a signal sent from the second wireless communication device to the first wireless communication device via the access point when the second wireless communication device changes its setting information from the first wireless setting information to the second wireless setting information; and maintain the first wireless setting information as the wireless setting information for communicating the specific data in a case where the predetermined signal is not received.

\* \* \* \* \*